United States Patent
Nakano et al.

(10) Patent No.: US 7,263,252 B2
(45) Date of Patent: Aug. 28, 2007

(54) OPTICAL SWITCH AND METHOD OF CONTROLLING OPTICAL SWITCH

(75) Inventors: Junichi Nakano, Hachioji (JP); Kenzi Murakami, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/898,913

(22) Filed: Jul. 26, 2004

(65) Prior Publication Data

US 2005/0025411 A1 Feb. 3, 2005

(30) Foreign Application Priority Data

Jul. 28, 2003 (JP) .............................. 2003-281065

(51) Int. Cl.
*G02B 6/26* (2006.01)
(52) U.S. Cl. .......................................... 385/18; 385/16
(58) Field of Classification Search ................... 385/16, 385/18
See application file for complete search history.

(56) References Cited

U.S. PATENT DOCUMENTS

| | | | |
|---|---|---|---|
| 5,337,097 A * | 8/1994 | Suzuki et al. ............... | 353/101 |
| 5,428,218 A * | 6/1995 | Toughlian et al. ...... | 250/227.12 |
| 5,841,917 A * | 11/1998 | Jungerman et al. .......... | 385/17 |
| 5,943,454 A * | 8/1999 | Aksyuk et al. ............... | 385/22 |
| 6,097,859 A * | 8/2000 | Solgaard et al. ............. | 385/17 |
| 6,141,081 A * | 10/2000 | Das et al. ...................... | 355/53 |
| 6,188,504 B1 | 2/2001 | Murakami et al. | |
| 6,252,647 B1 * | 6/2001 | Shiraishi ...................... | 355/53 |
| 6,374,008 B2 * | 4/2002 | Solgaard et al. ............. | 385/17 |
| 6,453,083 B1 * | 9/2002 | Husain et al. ................ | 385/17 |
| 6,463,190 B1 | 10/2002 | Kato et al. | |
| 6,477,290 B1 * | 11/2002 | Wan et al. ..................... | 385/17 |
| 6,490,384 B2 * | 12/2002 | Yong ............................. | 385/17 |
| 6,690,885 B1 | 2/2004 | Aksyuk et al. | |
| 6,941,073 B2 * | 9/2005 | McGuire ...................... | 398/84 |
| 7,058,251 B2 * | 6/2006 | McGuire, Jr. ................ | 385/16 |
| 2002/0034354 A1 | 3/2002 | Hayashi et al. | |
| 2002/0196520 A1 * | 12/2002 | Marom et al. .............. | 359/290 |
| 2003/0053749 A1 * | 3/2003 | Weverka et al. .............. | 385/24 |

(Continued)

FOREIGN PATENT DOCUMENTS

EP 1 102 104 A2 5/2001

(Continued)

OTHER PUBLICATIONS

Patent Abstracts of Japan of Japanese Publication No. 59-180462, published Oct. 13, 1984.

*Primary Examiner*—Ellen Kim
(74) *Attorney, Agent, or Firm*—Scully, Scott, Murphy & Presser, P.C.

(57) ABSTRACT

An optical switch of the present invention includes at least one input optical fiber, output optical fibers, at least one movable mirror for directing a light beam from the input optical fiber selectively to one of the output optical fibers, and at least one shutter for appropriately intercepting the light beam traveling toward the movable mirror from the input optical fiber. A direction of the movable mirror is changeable, and the direction of the movable mirror is changed to switch the output optical fiber that combines with the light beam reflected by the movable mirror. The shutter intercepts the light beam traveling toward the movable mirror while the direction of the movable mirror is changed.

17 Claims, 5 Drawing Sheets

U.S. PATENT DOCUMENTS

2004/0080733 A1* 4/2004 Shiraishi .................. 355/53

FOREIGN PATENT DOCUMENTS

| | | |
|---|---|---|
| EP | 1 239 695 A2 | 9/2002 |
| JP | 10-20226 | 1/1998 |
| JP | 2000-258704 | 9/2000 |
| JP | 2001-174724 | 6/2001 |
| WO | WO 01/61400 | 8/2001 |

* cited by examiner

0
OPTICAL SWITCH AND METHOD OF CONTROLLING OPTICAL SWITCH

CROSS-REFERENCE TO RELATED APPLICATIONS

This application is based upon and claims the benefit of priority from prior Japanese Patent Application No. 2003-281065, filed Jul. 28, 2003, the entire contents of which are incorporated herein by reference.

BACKGROUND OF THE INVENTION

1. Field of the Invention

The present invention relates to an optical switch for changing connection of signal light, particularly to an optical switch in which deflection of light by a movable mirror is used.

2. Description of the Related Art

U.S. Pat. Appln. Publication No. 2002/0196520A1 discloses an optical switch for wavelength division multiplexing (WDM) transmission, which is capable of switching connections between input optical fibers and output optical fibers via which signals having multiplexed wavelengths are transmitted for each wavelength. The device is applicable to a multiplexer (MUX), demultiplexer (DEMUX), and optical switch in accordance with the numbers of input optical fibers and output optical fibers.

In the optical switch, the light from the input optical fiber is formed into parallel light, split by a grating, formed into converging light through lenses, and applied to a MEMS mirror for each wavelength. By changing a direction of the MEMS mirror, reflected light traces a path different from that of the input light, and is combined with the output optical fiber that is disposed in a position different from that of the input optical fiber. Accordingly, the optical fiber that is an output destination can be selected by the changing of the direction of the MEMS mirror for each wavelength.

In the optical switch (the switch operates) in which specific light entering, that is, combining with the output optical fiber is switched to another output optical fiber from the current output optical fiber, unless the output optical fiber before the switching is adjacent to that after the switching, the light from the input optical fiber is combined with an intermediate output fiber that is not related to the switch operation in the process of the changing of the direction of the MEMS mirror.

BRIEF SUMMARY OF THE INVENTION

The present invention is, in an aspect, directed to an optical switch. The optical switch of the present invention comprises at least one input optical fiber, output optical fibers, at least one movable mirror for directing a light beam from the input optical fiber selectively to one of the output optical fibers, and at least one shutter for appropriately intercepting the light beam traveling toward the movable mirror from the input optical fiber. A direction of the movable mirror is changeable, and the direction of the movable mirror is changed to switch the output optical fiber that combines with the light beam reflected by the movable mirror. The shutter intercepts the light beam traveling toward the movable mirror while the direction of the movable mirror is changed.

The present invention is, in another aspect, directed to a method of controlling an optical switch, which includes at least one input optical fiber, output optical fibers, at least one movable mirror for directing a light beam from the input optical fiber selectively to one of the output optical fibers, and at least one shutter for appropriately intercepting the light beam traveling toward the movable mirror from the input optical fiber. The control method of the present invention comprises a step of bringing the shutter into a closed state to intercept the light beam traveling toward the movable mirror before starting changing a direction of the movable mirror, a step of changing the direction of the movable mirror while the shutter is in the closed state, and a step of bringing the shutter into an opened state to allow the light beam to enter the movable mirror after finishing changing the direction of the movable mirror.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described hereinafter with reference to the drawings.

FIRST EMBODIMENT

Figure 1:
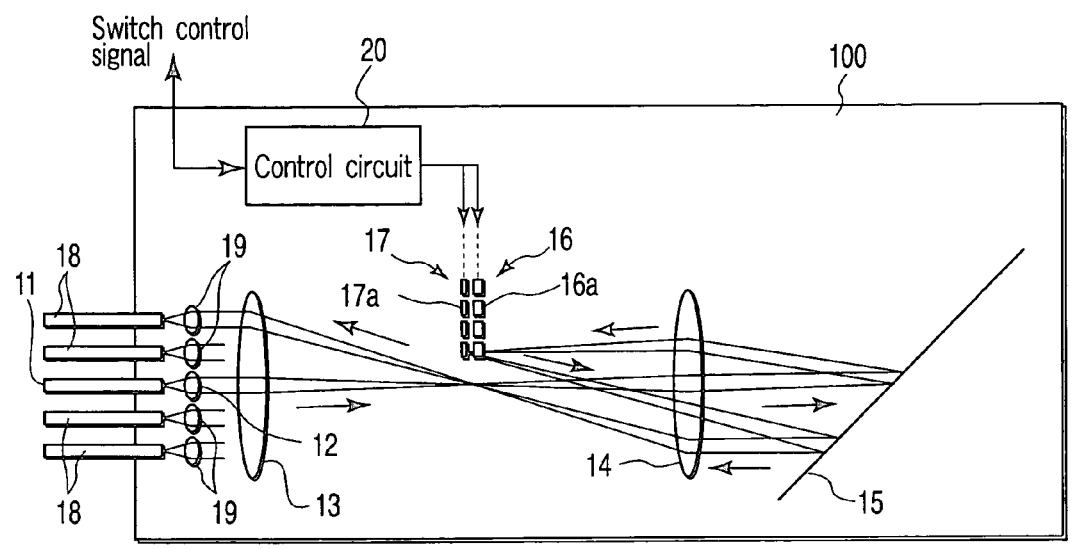
FIG. 1 shows a constitution of an optical switch according to a first embodiment of the present invention.

The present embodiment is directed to an optical switch, which switches signal light having multiplexed wavelengths for each wavelength. FIG. 1 shows a constitution of the optical switch according to the first embodiment of the present invention.

As shown in FIG. 1, an optical switch 100 of the present embodiment includes an input optical fiber 11, into which the signal light having multiplexed wavelengths (light including wavelength components) is input, output optical fibers 18, which output the light, a collimator lens 12, which changes a diverging light beam projected from the input optical fiber 11 into a parallel light beam, and the same number of converging lenses 19 as that of output optical fibers 18, which change parallel light beams directed by the output optical fibers 18 into converging light beams.

The optical switch 100 further includes a convex lens 13, which changes the parallel light beam from the collimator lens 12 into a converging light beam, a convex lens 14 for changing the diverging light beam from the convex lens 13, which have once converged, into a parallel light beam, and a grating 15, which deflects the parallel light beam from the convex lens 14 in different directions for each wavelength component to split into parallel light beams.

The grating 15 constitutes a splitter, which splits the incident wavelength-multiplexed light based on the wavelength. The parallel light beams deflected by the grating 15 enter the convex lens 14, and are changed into converging light beams.

The optical switch 100 further includes a movable mirror array 17, which directs the converging light beams from the convex lens 14 toward one of the output optical fibers 18, a shutter array 16 disposed in front of the movable mirror array 17, that is, near an incidence side of the light beams, and a control circuit 120, which controls the movable mirror array 17 and the shutter array 16.

The movable mirror array 17 includes movable mirrors 17a in accordance with kinds of multiplexed wavelengths in the signal light. The shutter array 16 includes the same number of shutters 16a as that of movable mirrors 17a of the movable mirror array 17. The shutters 16a respectively correspond to the movable mirrors 17a, and appropriately intercept the light beams traveling toward the movable mirrors 17a.

In the optical switch 100, the wavelength multiplexed signal light, that is, the light containing wavelength components is input into the input optical fiber 11. The light projected from the input optical fiber 11 turns into the diverging light beam, passes through the collimator lens 12, and is changed into the parallel light beam. The parallel light beam from the collimator lens 12 passes through the convex lens 13, and is changed into the converging light beam. The converging light beam once converge, and thereafter turn into the diverging light beam. The diverging light beam passes through the convex lens 14, and is changed into the parallel light beam to fall on the grating 15. The light beam that has fallen on the grating 15 is deflected in different directions for each wavelength component by a diffracting function of the grating 15, so as to be split into the light beams of wavelength components. In other words, the light that has fallen on the grating 15 is split for each wavelength.

The light beam of one wavelength component passes through the convex lens 14, is accordingly changed into the converging light beam, and is directed toward the movable mirror 17a of the movable mirror array 17. When the shutter 16a of the shutter array 16 corresponding to the movable mirror 17a is in an opened state, the converging light beam directed toward the movable mirror converges near the movable mirror, and is reflected by the movable mirror.

The direction (normal line direction) of the movable mirror 17a is changeable in a predetermined range about an axis. That is, the movable mirror 17a is rotatable about the axis in a predetermined angle range. The direction of the movable mirror 17a is controlled by the control circuit 120. Accordingly, the direction of the light beam reflected by the movable mirror 17a can be adjusted. As a result, the light beam reflected by the movable mirror 17a can be directed toward one of the output optical fibers 18.

The light beam reflected by the movable mirror 17a passes through the convex lens 14, is changed into the parallel light beam, is deflected by the grating 15, passes through the convex lens 14 again, and is changed into the converging light beam. The converging light beam converges once, thereafter turns into the diverging light beam, passes through the convex lens 13, and is changed into the parallel light beam. The parallel light beam is changed into the converging light beam through the converging lens 19 to enter one of the output optical fibers 18, for example, the output optical fiber 18 in an uppermost position in FIG. 1, with the direction of the movable mirror 17a being appropriately adjusted. The light that has entered the output optical fiber 18 is output from the output optical fiber 18.

The output optical fiber 18 that the light beam reflected by the movable mirror 17a enters depends on the direction (deflection angle) of the movable mirror 17a. That is, the output optical fiber 18 that the light beam reflected by the movable mirror 17a enters is selectively switchable by changing the direction of the movable mirror 17a.

Since an operation of the optical switch is similar to that of an optical switch described, for example, in U.S. Pat. Appln. Publication No. 2002/0196520A1, the detailed description is omitted here.

Figure 2:
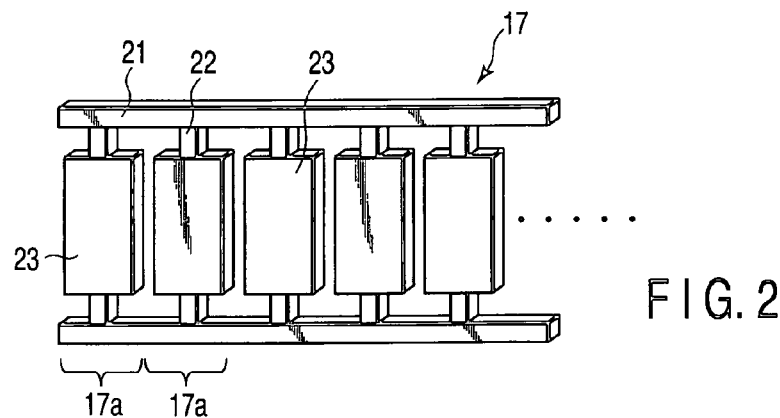
FIG. 2 shows a movable mirror array for use in the optical switch of FIG. 1.

FIG. 2 shows the movable mirror array 17 for use in the optical switch of FIG. 1. The movable mirror array 17 includes mirrors 23 aligned in a row, a pair of frames 21 extending on opposite sides along arrangement of the mirrors 23, and hinges 22, which connect the mirrors 23 to the frames 21. Each of the mirrors 23 is connected to the two frames 21 through two hinges 22 extending on a straight line. Since the hinges 22 are comparatively easily twisted, the directions of the mirrors 23 are changeable in predetermined angle ranges using the hinges 22 as axes.

The movable mirror array 17 includes driving electrodes (not shown) apart from back surfaces of the respective mirrors 23 and fixed electrodes (GND electrodes) (not shown) on back surfaces of the mirrors 23, and the direction of the mirrors 23 can be changed by an electrostatic force generated by applying a voltage between the driving electrodes and the fixed electrodes.

The movable mirror that can be electrostatically driven can be prepared using a micro electro mechanical system (MEMS) technique, this is also introduced, for example, in Jpn. Pat. Appln. KOKAI Publication No. 2001-174724 and Publication No. WO01/61400A2, and therefore the detailed description is omitted herein.

Figure 3:
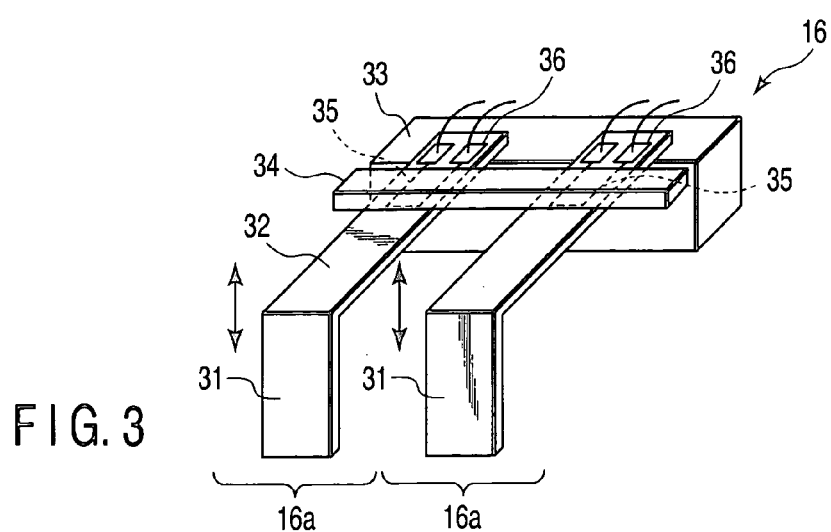
FIG. 3 shows a shutter array for use in the optical switch of FIG. 1.

FIG. 3 shows the shutter array 16 for use in the optical switch of FIG. 1. The shutter 16a in the shutter array 16 includes a flat plate shaped shielding portion 31 for intercepting the light, a beam portion 32, which supports the shielding portion 31, and a fixed portion 33, which supports the beam portion 32 in a cantilever manner. The shielding portion 31 is connected to a free end of the beam portion 32, and extends substantially vertically with respect to the beam portion 32. In the present specification, "substantially vertical" means just vertical and nearly vertical. The beam portion 32 is comparatively flexible, and is elastically bendable/deformable. With the bending/deforming of the beam portion 32, the shielding portion 31 moves up and down in FIG. 3.

The shutter 16a further includes a permanent magnet 34 disposed above the beam portion 32 at an interval, a driving line 35 disposed in the beam portion 32, and pads 36 for supplying a current to the driving line 35. The permanent magnet 34 and the driving line 35 constitute an actuator that bends/deforms the beam portion to move the shielding portion.

When the current is supplied to the driving line 35, the beam portion 32 is bent/deformed upwards in FIG. 3, and the shielding portion 31 is moved upwards by an electromagnetic force produced by an interaction of the current flowing through the driving line 35 and a magnetic field formed by the permanent magnet 34. When the supply of the current to the driving line 35 is stopped, the bending/deforming of the beam portion 32 is eliminated, and the shielding portion 31 returns to its original position. That is, the shutter 16a is driven by an electric signal, that is, the current. By controlling the electric signal, that is, the current, the shielding portion 31 can be moved upwards/downwards in FIG. 3. In the shutter array 16, the shielding portions 31, beam portions 32, driving lines 35, and pads 36 can be easily integrally manufactured by the MEMS technique.

Figure 4:
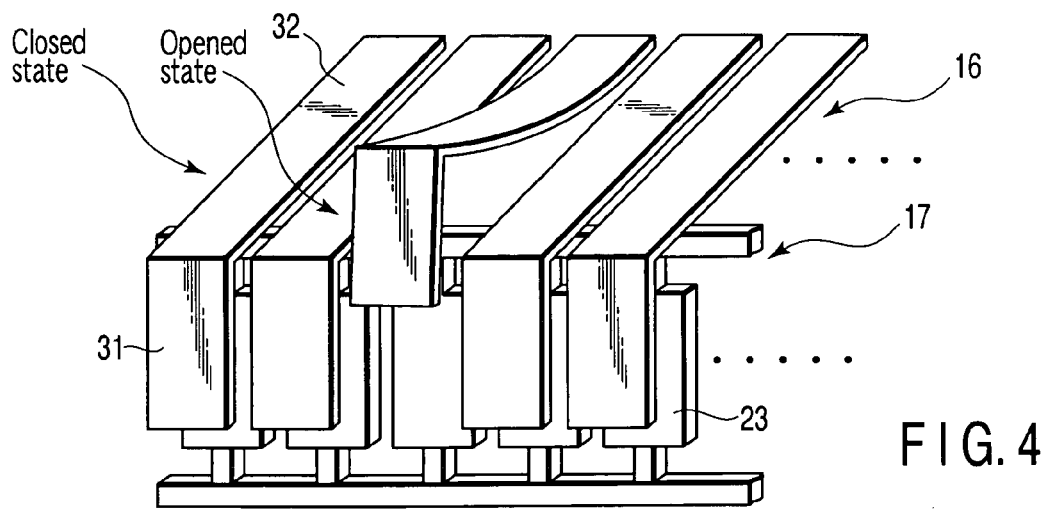
FIG. 4 is a perspective view of the movable mirror array of FIG. 2 and the shutter array of FIG. 3.

FIG. 4 is a perspective view of the movable mirror array 17 and the shutter array 16. As shown in FIG. 4, the mirrors 23 of the movable mirror array 17 and the shielding portions 31 of the shutter array 16 are arranged at equal pitches. When the beam portions 32 are not bent/deformed, the shielding portions 31 are position just in front of the mirrors 23.

Figures 5A, 5B:
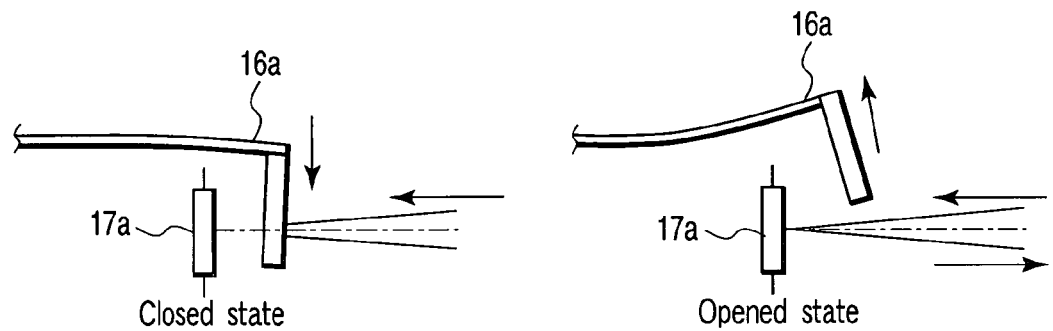
FIG. 5A shows a "closed state" of one shutter shown in FIG. 4.
FIG. 5B shows an "opened state" of the shutter shown in FIG. 5A.

FIG. 5A shows a "closed state" of one shutter 16a of the shutter array 16, and FIG. 5B shows an "opened state" of the shutter 16a. When the electric signal is not supplied, the shutter 16a has the "closed state" in which the beam portion 32 is not bent/deformed, and the shielding portion 31 is positioned just in front of the mirror 23. Therefore, the light beam traveling toward the mirror 23 substantially from a front surface is intercepted by the shielding portion 31 positioned before the mirror. When the electric signal is supplied, as shown in FIG. 5B, the shutter array has the "opened state" in which the beam portion 32 is bent/deformed, and the shielding portion 31 is moved upwards and removed from the position before the mirror 23. Therefore, the light beam traveling toward the mirror 23 substantially from the front surface can enter the mirror 23 without being intercepted by the shielding portion 31. That is, the light beam is allowed to enter the mirror 23.

In FIGS. 4, 5A, 5B, wirings (power supply wires from the outside) for driving the shutter array 16 of the movable mirror array 17 are not shown. To avoid mechanical interference, the wirings may be connected to the shutter array 16 from above in the drawing, and connected to the movable mirror array 17 from below in the drawing.

Figure 6:
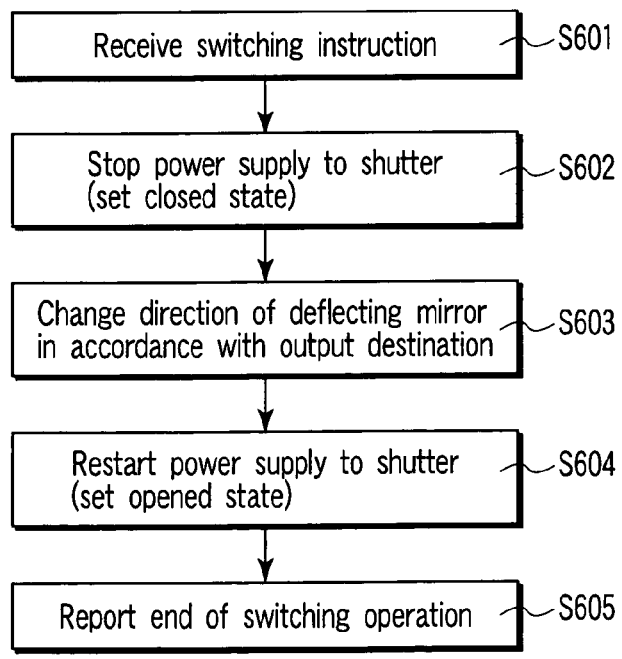
FIG. 6 shows a flowchart of a switching operation in the optical switch shown in FIG. 1.

Subsequently, a switching operation in the optical switch of the present embodiment, that is, an operation of selectively switching the output optical fiber by the movable mirror while preventing crosstalk from being generated will be described with reference to a flowchart of FIG. 6. Here, as an example, a case where an output channel is switched to the third output optical fiber 18 from the uppermost output optical fiber 18 in FIG. 1 will be described.

Usually, in a state in which the signal luminous is passed, all the shutters of the shutter array 16 are in the opened state. That is, the shutter array 16 entirely has a state in which power is supplied to the driving lines 35.

When a switching instruction is supplied to the control circuit 120 from a high-order controller (not shown) (S601), the control circuit 120 stops the power supply to the driving line 35 of the shutter 16a corresponding to a wavelength constituting a switching object, and brings the shutter into the closed state (S602). Thereafter, the control circuit 120 supplies a driving signal to the corresponding movable mirror, that is, the movable mirror 17a constituting a pair with the shutter brought into the closed state, and controls the direction of the movable mirror 17a in such a manner that the light beam is directed toward the third output optical fiber 18, which is a new output destination (S603).

In this case, since the shutter 16a is in the closed state, the light beam from the input optical fiber 11 is intercepted by the shielding portion 31, and does not fall on the movable mirror 17a. Therefore, while the direction of the movable mirror 17a is changed, any reflected light beam from the movable mirror 17a is not generated. Therefore, the light beam from the movable mirror 17a does not fall on any output optical fiber 18 or the input optical fiber 11. As a result, the generation of the crosstalk with respect to the optical fiber that is not related to the switching operation can be avoided.

After finishing changing the direction of the movable mirror 17a, the control circuit 120 resumes the power supply to the driving line 35 of the shutter 16a, and returns the shutter 16a into the opened state (S604). As a result, new optical connection to the third output optical fiber 18 from the input optical fiber 11 is established. The control circuit 120 reports the end of the switching operation to the high-order controller (S605), and a series of switching operation accordingly ends.

As described above, according to the present embodiment, in the optical switch that selectively switches the output optical fiber by the changing of the direction of the movable mirror, that is, rotation, the shutter is disposed near the movable mirror. In the midst of the changing of the direction of the movable mirror, the light beam traveling toward the movable mirror is intercepted by the shutter, and therefore the crosstalk is prevented from being generated in the output optical fiber that is not related to the switching operation during the changing of the direction of the movable mirror. That is, the generation of the crosstalk during the switching operation (the switching of the output optical fiber) can be controlled independently for a switching unit, that is, each wavelength.

Furthermore, according to the present embodiment, the shutter 16a is brought into the closed state, when any driving signal is not supplied to the driving line 35. Therefore, for example, even when the light is input into the input optical fiber at the time of power-off, any light is not output from the output optical fiber. Accordingly, malfunction of the device is prevented, and ease of operation is improved.

In the present embodiment, by a simple structure, the shutter 16a can be realized, and both miniaturization and cost reduction can be established.

The front surface of the shielding portion 31 (on which the light beam falls) may have a low reflectance. Furthermore, the front surface of the shielding portion 31 may have a non-regular reflective property. For example, the front surface of the shielding portion 31 may be a coarse surface in such a manner as to diffuse the entering light beam. Alternatively, a grating that deflects the entering light beam in a specific direction may also be formed on the front surface of the shielding portion 31. This constitution has an effect of reducing undesired stray light. That is, since the light reflected by the front surface of the shielding portion 31 is scattered and does not return to the input optical fiber or the output optical fiber, the crosstalk can be more effectively inhibited from being generated.

The shutter is prepared, for example, by MEMS technique. In this case, the shielding portion 31 is generally formed of Si. In long-distance optical communication, in general, infrared light (1.3 to 1.6 µm) is used. The infrared light undesirably transmits Si to a certain degree. Therefore, to securely intercept the light beam that is to pass through the shielding portion 31, a film of a metal or the like may further be disposed on the back surface of the shielding portion 31.

Moreover, as shown in FIG. 5A, in the closed state, the front surface of the shielding portion 31 may be inclined to a certain degree (e.g., one degree or more) with respect to a principal ray in the light beam traveling toward the movable mirror 17a, especially about an axis that is substantially perpendicular to a rotation axis of the movable mirror 17a and extends along the front surface of the movable mirror 17a. This constitution has an effect of reducing the undesirable stray light. That is, the light reflected by the front surface of the shielding portion 31 does not enter, that is, combine with any output optical fiber, and the crosstalk can be securely suppressed.

Figure 7:
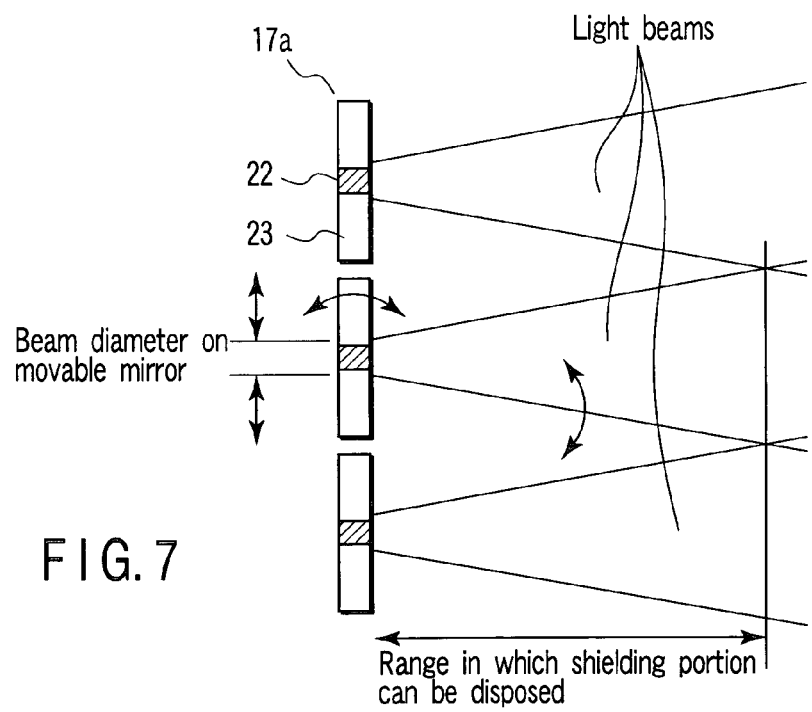
FIG. 7 is an explanatory view of a range in which a shielding portion of the shutter shown in FIGS. 3, 4, 5A, and 5B can be disposed.

In the present embodiment, a distance between the movable mirror 17a and the shutter 16a is important. When the distance is excessively short, both of them mechanically interfere. When the distance is long, the interception of the light beam having the wavelength that is a switching object (crosstalk inhibition) is not sufficiently performed. Conversely, the light beam having a wavelength that is not the switching object is influenced. To avoid these problems, the shielding portion of the shutter 16a needs to be disposed in a range in which the light beams are not superimposed as shown by arrows in FIG. 7.

As representative or easily designed values, a case will be considered where the pitch of the mirror 23 is 0.5 mm, a beam diameter on the mirror 23 is 0.1 mm, and a numerical aperture (NA) of the light beam is 0.1 including a rotation angle of the mirror 23. Since a distance between edges of the light beam is 0.4 mm, and here the light beam spreads at NA=0.1 (approximately 5.7 degrees on one side), a distance d to the shielding portion 31 from the mirror 23 is d<0.4/2/tan 5.7°≈2 mm. It is seen that the shielding portion 31 may be disposed in a position of 2 mm or less from the mirror 23. Accordingly, the crosstalk can be securely suppressed with respect to an object to be subjected to the switching operation, and further an influence onto another channel (light loss, etc.) can also be inhibited from being generated. In actual design, for restrictions in manufacturing the grating 15 (a groove pitch needs to be narrowed in order to widen a mirror interval, that is, a wavelength interval) or miniaturization of the movable mirror array 17, it is preferable that the pitch of the mirror 23 be designed to be smaller. In this case, the shutter 16a needs to be positioned further near the movable mirror 17a.

Moreover, as shown in FIGS. 4, 5A, 5B, since the beam portion 32 of the shutter 16a is positioned on the side of the movable mirror 17a from the shielding portion 31, that is, the beam portion 32 extends in reverse to the light beam entering the movable mirror 17a, there is not any member protruding on the side of the convex lens 14 from the shielding portion 31, and degree of freedom in optical design increases. For example, the convex lens 14 is easily constituted of lenses, as a result, optical properties are improved, and, for example, insertion loss can be improved.

Figure 8:
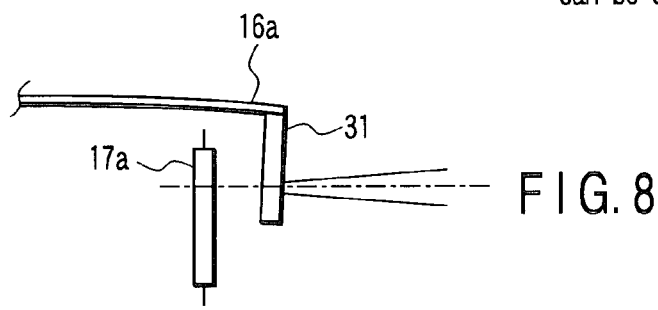
FIG. 8 shows a constitution of another shutter that is applicable instead of the shutter shown in FIGS. 5A and 5B.

In FIGS. 5A and 5B, the light beam traveling toward the movable mirror 17a is set to falls on substantially a middle of the movable mirror 17a, but the incident position of the light beam may be offset from the substantially middle of the movable mirror 17a. In the present specification, "substantially middle" means just middle and nearly middle. In general, in order to secure the deflection angle of the movable mirror, it is advantageous to increase a driving force of the movable mirror, and therefore a mirror portion may be larger. In this case, as shown in FIG. 8, while the movable mirror is designed to be large, the incident position of the light beam may be offset from the middle of the movable mirror (moved to an end). Accordingly, while a driving force is increased, and the deflection angle of the movable mirror is secured, enlargement of the shielding portion of the shutter or a movable range can be avoided.

Moreover, in the present embodiment, the shutter 16a is electromagnetically driven in such a manner that a large driving force can be produced, and therefore an increase of a switching time by opening/closing of the shutter can be minimized. Since the driving force is large, a large stroke of the shielding portion can also be realized. Accordingly, the degree of freedom in designing portions around the movable mirror, including the shutter, can be improved.

Needless to say, a driving system of the shutter 16a is not limited to the electromagnetic driving, and various systems can be considered. For example, the driving by an electrostatic force as in the movable mirror of the present embodiment is also considered. In this case, the driving force is slightly small, but a shutter structure can be simplified and miniaturized.

Figure 13:
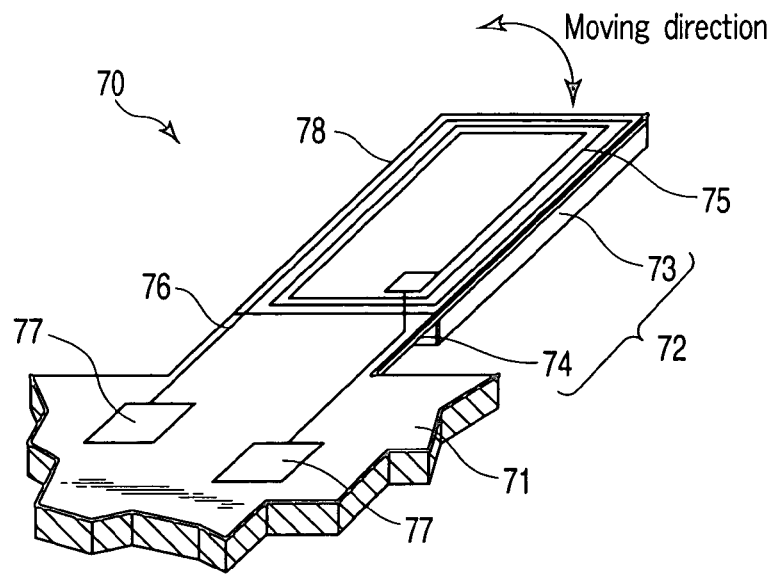
FIG. 13 is a perspective view of another shutter that is applicable to the optical switch according to the first embodiment of the present invention.
Figure 14:
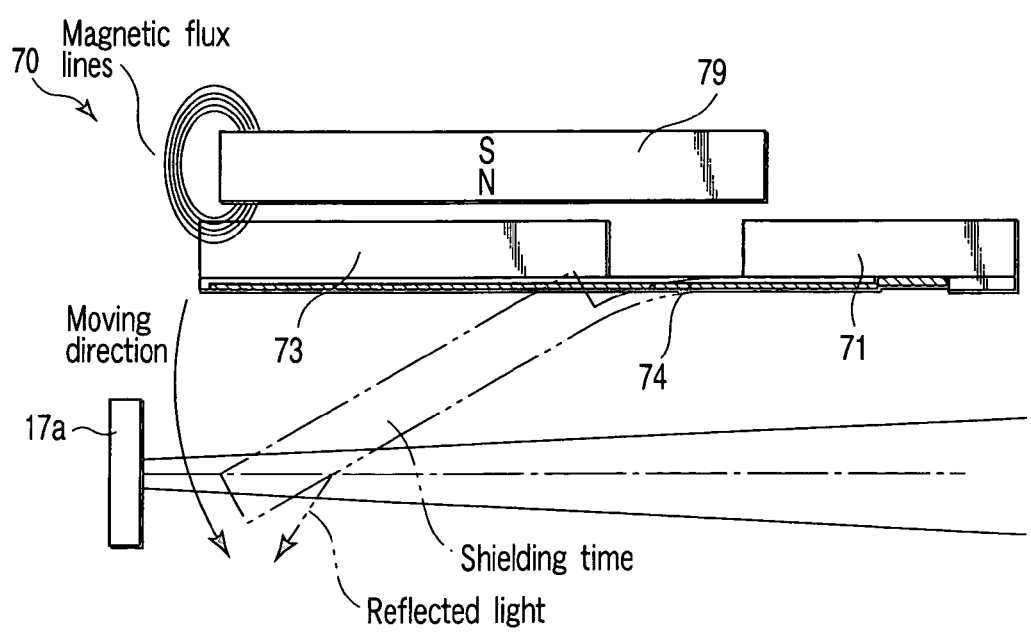
FIG. 14 is a side view of the shutter shown in FIG. 13.

FIG. 13 is a perspective view of another shutter that is applicable to the optical switch 100 of the present embodiment. FIG. 14 is a side view of the shutter shown in FIG. 13. As shown in FIGS. 13 and 14, a shutter 70 of the present modification includes a beam portion 72, which is supported by a fixed portion 71 in a cantilever manner and which has an elastically deformable flat plate shape. The beam portion 72 is supported substantially in parallel with the principal ray in the light beam traveling toward the movable mirror 17a. In the present specification, "substantially parallel" means just parallel and nearly parallel. The beam portion 72 includes a shielding portion 73, and a spring portion 74, which connects the shielding portion 73 to the fixed portion 71. That is, the beam portion 72 includes the shielding portion 73 on its free end portion. Bending rigidity of the spring portion 74 is smaller than that of the shielding portion 73, and therefore substantially only the spring portion 74 is elastically bendable/deformable. With the bending/deforming of the spring portion 74, the shielding portion 73 moves up and down in FIG. 14.

As described above, the shielding portion 73 is generally formed of Si, and in general the infrared light (1.3 to 1.6 µm) is used in the long-distance optical communication. The infrared light undesirably transmits Si to a certain degree. Therefore, to securely intercept the light beam that is to pass through the shielding portion 31, a shielding film 78 such as a metal film is formed on the surface on which the driving coil 75 is formed. The shielding film 78 may be formed on the surface opposed to the surface on which the driving coil 75 is formed.

The shutter 70 further includes a permanent magnet 79 disposed at an interval from the shielding portion 73, and a driving coil 75 disposed in the shielding portion 73. A magnetic flux of the permanent magnet 79 and the current flowing through the driving coil 75 produce the electromagnetic force by interaction, and the shielding portion 73 is moved by the produced electromagnetic force. That is, the permanent magnet 79 and the driving coil 75 constitute an actuator which bends/deforms the beam portion 72 to move the shielding portion 73.

The driving coil 75 is connected to extraction electrodes 77 formed on the fixed portion 71 through a wiring 76 extending in the spring portion 74, and the current can be supplied from the outside.

The permanent magnet 79 is polarized in a direction in which the shielding portion 73 moves, and is disposed in such a manner that one end of the magnet is disposed over the shielding portion 73, and the other end is disposed over the fixed portion 71. Accordingly, the electromagnetic force can be produced only in a portion of the driving coil 75 near a free end of the shielding portion 73.

As described above, carbon, TiN, or the like for scattering the reflected light may also be formed into a film on the front surface (surface on which the light beam falls) of the shielding portion 73. However, in the shutter, since the shielding portion 73 enters at a small angle with respect to the incident light beam, in other words, a traveling direction of regularly reflected light is largely different from that of the incident light beam, a metal film having a high reflectance or the like may be rather disposed on the front surface of the shielding portion 73 to regularly reflect the light. In this case, as a result, the undesirable stray light entering the input optical fiber 11 or the output optical fiber 18 again can be more preferably inhibited from being generated. That is, the front surface of the shielding portion 73 may be provided with a regular reflective property with respect to the light. Accordingly, a reflection angle on the front surface of the shielding portion 73 is large, the reflected light does not enter or combine with any output optical fiber, and the crosstalk can be securely suppressed.

The shutter of the present modification can be prepared based on a preparing method described, for example, in Jpn. Pat. Appln. KOKAI Publication No. 10-20226.

According to the shutter 70 of the present modification, as shown in FIG. 14, while the movable mirror 17a is switched, that is, while the direction of the movable mirror 17a is changed, the driving current can be supplied to the shutter to intercept the light traveling toward the movable mirror 17a, and the crosstalk can be suppressed. Further in the present modification, a structure of the shutter 70 can be simplified. Additionally, in the shutter 70 of the present modification, since the light beam can be intercepted by comparatively small movement of the shielding portion 73, the degree of freedom in design is improved.

FIG. 13 shows that a shielding state is achieved when the current is supplied to the driving coil 75. However, this constitution may also be changed in such a manner that the shielding state is achieved when the current is not supplied, and the shielding portion 73 is attracted by the permanent magnet 79 to achieve a non-shielding state when the current is supplied. In this case, as described already in the first embodiment, the malfunction of the device can be prevented, and the ease of operation can be improved.

SECOND EMBODIMENT

Figure 9:
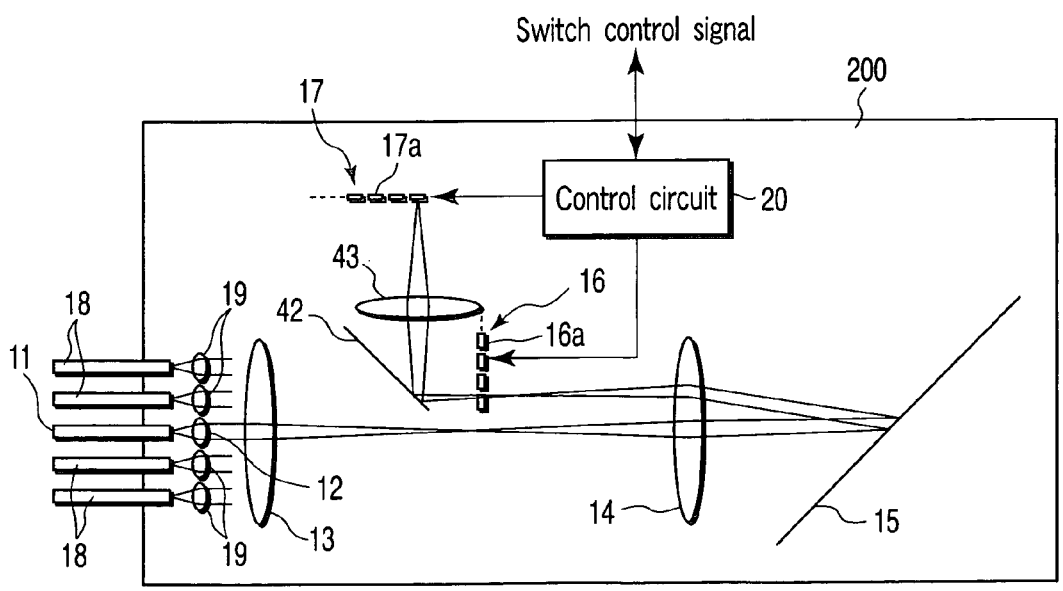
FIG. 9 shows a constitution of the optical switch according to a second embodiment of the present invention.

The present embodiment is directed to another optical switch that switches a wavelength multiplexed signal light for each wavelength. FIG. 9 shows a constitution of the optical switch according to a second embodiment of the present invention. In FIG. 9, members denoted with the same reference numerals as those of the members shown in FIG. 1 are similar members, and the detailed description is omitted.

As shown in FIG. 9, in an optical switch 200 of the present embodiment, as compared with the optical switch of the first embodiment shown in FIG. 1, a fixed mirror 42 and a relay lens 43 are added, and movable mirrors 17a are disposed apart from shutters 16a.

The shutters 16a are disposed near a converging point of a converging light beam from a convex lens 14. The fixed mirror 42 deflects a light beam that has passed the shutter 16a toward the relay lens 43. The converging light beam from the convex lens 14 passes the shutter 16a and turns to a diverging light beam, and the relay lens 43 changes the diverging light beam into the converging light beam. The movable mirror 17a is disposed near the converging point of the converging light beam from the relay lens 43.

The shutter 16a and the movable mirror 17a are disposed in positions having a confocal relation through the relay lens 43. Therefore, the optical switch 200 of the present embodiment is optically equivalent to the optical switch 100 of the first embodiment. Therefore, the optical switch 200 of the present embodiment operates in the same manner as in the optical switch 100 of the first embodiment.

In the optical switch 200 of the present embodiment, as compared with the optical switch 100 of the first embodiment, the fixed mirror and the relay lens are added, therefore a whole size enlarges, but the positions of the movable mirrors are distant from those of the shutters, and therefore a degree of freedom in designing the movable mirrors and shutters is high. That is, in the present embodiment, the movable mirrors 17a in the optical switch of the first embodiment are moved to optically equivalent positions, and accordingly an allowance in a whole layout is improved.

When the movable mirror and the shutter are disposed in the optically equivalent positions as in the present embodiment, it is preferable that the shutter should is located at a completely confocal position with the movable mirror, or a position of 2 mm or less, as described in the first embodiment, from the completely confocal position.

Figure 10:
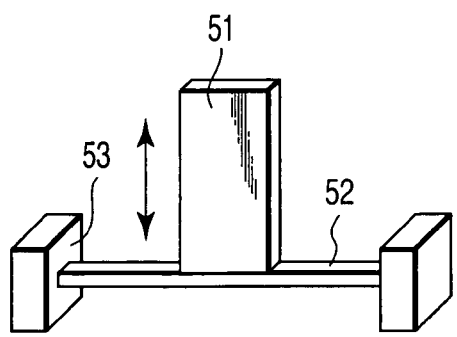
FIG. 10 shows a constitution of the shutter that is preferably applicable to the optical switch shown in FIG. 9.

FIG. 10 shows a constitution of the shutter that is preferably applicable to the optical switch 200 of the present embodiment. As shown in FIG. 10, the shutter includes a beam portion 52, which is supported by a pair of fixed portions 53 in a center impeller manner and which is elastically deformable, and a flat plate shaped shielding portion 51 supported by the substantially middle of the beam portion 52. The beam portion 52 extends along the front surface (surface on which the light beam falls) of the shielding portion 51. The shielding portion 51 is driven up and down in the drawing by an electrostatic force by a driving electrode (not shown) disposed near the middle of the beam portion 52. Details of the shutter are described, for example, in Jpn. Pat. Appln. KOKAI Publication No. 2000-258704.

Since this shutter can be miniaturized with respect to a depth direction (traveling direction of the light), a shutter portion can be constituted to be smaller.

Figure 11:
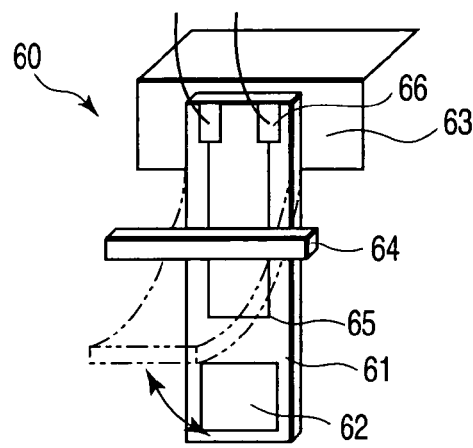
FIG. 11 shows a constitution of another shutter that is preferably applicable to the optical switch shown in FIG. 9.

FIG. 11 shows a constitution of another shutter that is preferably applicable to the optical switch 200 of the present embodiment. As shown in FIG. 11, a shutter 60 of the present modification includes a flat plate shaped beam portion 61, which is supported by a fixed portion 63 in a cantilever manner and which is elastically deformable, and the beam portion 61 includes a shielding portion 62 in its free end portion. The shutter further includes a permanent magnet 64 disposed sideways at an interval from the beam portion 61, a driving line 65 disposed on the beam portion 61, and pads 66 for supplying a current to the driving line 65. The permanent magnet 64 and the driving line 65 constitute an actuator that bends/deforms the beam portion 61 to move the shielding portion 62.

In this shutter, in the same manner as in the shutter shown in FIG. 3, when the beam portion 61 is bent/deformed by an electromagnetic force generated by an interaction between the current flowing through the driving line 65 and a magnetic field formed by the permanent magnet 64, the shielding portion 62 is moved.

In the shutter 60 of the present modification, simplification of a structure is possible together with miniaturization. Since a size in a direction perpendicular to the light beam is easily reduced, a degree of freedom in optical design is improved.

The constitution of the shutter described here is applicable to not only the optical switch of the present embodiment but also that described in the first embodiment.

In the first and second embodiments, the optical switch including four output optical fibers has been described, but the number of output optical fibers is not limited to this, and two, three, or five or more output optical fibers may also be disposed.

Moreover, the first or second embodiment provides an optical switch of a splitting type at 1:n, including one input optical fiber and output optical fibers. However, when the input optical fiber and output optical fiber light are reversed, an optical switch of a multiplexer type at n:1 may also be provided.

THIRD EMBODIMENT

Figure 12:
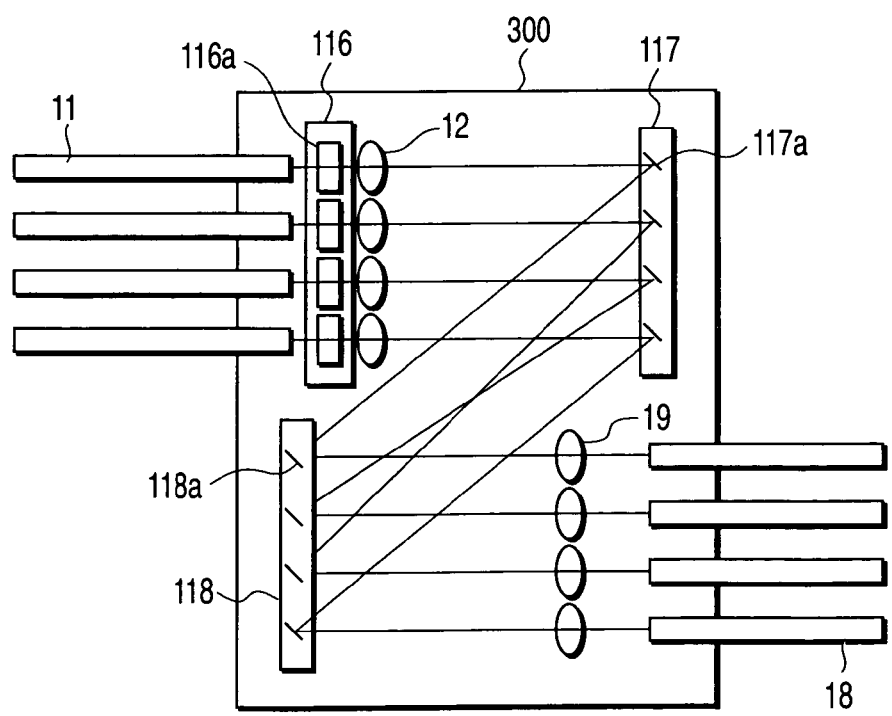
FIG. 12 shows a constitution of the optical switch according to a third embodiment of the present invention.

The present embodiment is directed to an optical switch of a cross-connection type including input optical fibers and output optical fibers. FIG. 12 shows a constitution of the optical switch according to the third embodiment of the present invention. In FIG. 12, members denoted with the same reference numerals as those of the members shown in FIG. 1 are similar members, and the detailed description is omitted.

As shown in FIG. 12, an optical switch 300 of the present embodiment includes input optical fibers 11, the same number of collimator lenses 112 as that of input optical fibers 11, output optical fibers 18, and the same number of converging lenses 119 as that of output optical fibers 18.

The collimator lenses 112 respectively correspond to the input optical fibers 11, and change diverging light beams projected from the corresponding input optical fibers 11 into parallel light beams. The converging lenses 119 respectively correspond to the output optical fibers 18, and change the parallel light beams directed toward the corresponding output optical fibers 18 into the converging light beams.

The optical switch 300 further includes a shutter array 116, an input-side movable mirror array 117, and an output-side movable mirror array 118.

The shutter array 116 is positioned between the input optical fibers 11 and the collimator lenses 112, and includes the same number of shutters 116a as that of input optical fibers 11. The shutters 116a respectively correspond to the input optical fibers 11, and appropriately intercept the light beams projected from the corresponding input optical fibers 11. The shutters 116a may also be constituted of various shutters described above.

The input-side movable mirror array 117 includes the same number of movable mirrors 117a as that of input optical fibers 11. The movable mirrors 117a respectively correspond to the input optical fibers 11, and change the direction of the light beams from the corresponding input optical fibers 11.

The output-side movable mirror array 118 includes the same number of movable mirrors 118a as that of the output optical fibers 18. The movable mirrors 118a respectively correspond to the output optical fibers 18, and direct the light beams from the input-side movable mirror array 117 toward the corresponding output optical fibers 18.

In the optical switch 300 of the present embodiment, the diverging light beam projected from the input optical fiber 11 passes through the corresponding collimator lens 112, to turn into the parallel light beam, and then falls on the corresponding movable mirror 117a in the input-side movable mirror array 117. The movable mirror 117a directs the light beam that has fallen on the mirror toward the corresponding movable mirror 118a in the output-side movable mirror array 118 corresponding to the output optical fiber 18 that is to output signal light. The movable mirror 118a directs the light beam from the input-side movable mirror array 117 to the corresponding output optical fiber 18.

The parallel light beam from the movable mirror 118a passes through the corresponding converging lens 119, to turn into converging light beams, and then enters or combines with the corresponding output optical fiber 18. Accordingly, optical connection is established.

In the optical switch 300 of the present embodiment, to switch an output destination of the light beam from an input optical fiber 11, the directions of the movable mirror 117a corresponding to the input optical fiber 11 and the movable mirror 118a corresponding to the output optical fiber 18 of a switched destination are changed.

In this case, in the same manner as in the first embodiment, before starting changing the directions of a movable mirror 117a and a movable mirror 118a, first the corresponding shutter 116a is brought into a closed state, and the light beam traveling toward the movable mirror 117a from the corresponding input optical fiber 11 is intercepted. Subsequently, while the shutter 116a is maintained in the closed state, the directions of the movable mirror 117a and movable mirror 118a are changed. Next, after finishing changing the directions of the movable mirror 117a and movable mirror 118a, the shutter 116a is switched to an opened state, so that the light beam is allowed to fall on the movable mirror 117a from the input optical fiber 11.

Accordingly, the light beam projected from the input optical fiber 11 enters or combines with the output optical fiber 18 of a new switching destination through the movable mirror 117a and movable mirror 118a that correspond to the output optical fiber 18 of the new switching destination. As a result, optical connection is established.

According to the present embodiment, while the direction of a movable mirror is changed, the light beam traveling toward the movable mirror is intercepted by the shutter. Therefore, even in the optical switch of the cross-connection type, undesired crosstalk on an output optical fiber side can be inhibited from being generated.

It is to be noted that details of a constitution or an operation of the optical switch of the cross-connection type are described, for example, in Jpn. Pat. Appln. KOKAI Publication No. 2001-174724.

In the present embodiment, the optical switch of a so-called 3D-MEMS type shown in FIG. 12 or described in Jpn. Pat. Appln. KOKAI Publication No. 2001-174724 has been described, but the present invention is applicable to various types of optical switches such as optical switches of a 2D-MEMS type.

The embodiments of the present invention have been described with reference to the drawings, but the present invention is not limited to these embodiments, and various modifications or alterations may also be carried out without departing from the scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical switch comprising:
   at least one input optical fiber;
   output optical fibers;
   at least one movable mirror, which directs a light beam from the input optical fiber selectively to one of the output optical fibers, a direction-of the movable mirror being changeable, and the direction of the movable mirror being changed to switch the output optical fiber that combines with the light beam reflected by the movable mirror;
   at least one shutter, which appropriately intercepts the light beam traveling toward the movable mirror from the input optical fiber, the shutter intercepting the light beam traveling toward the movable mirror while the direction of the movable mirror is changed;
   a splitter, which splits the light beam of wavelength multiplexed light (light containing wavelength components) projected from the input optical fiber into light beams based on a wavelength of the light beam from the input optical fiber; and a lens, which changes the split light beams into converging light beams, the optical switch further comprising: movable mirrors including said movable mirror, the number of movable mirrors being more than or equals to that of light beams split by the splitter, the movable mirrors respectively corresponding to the light beams split by the splitter, the optical switch further comprising shutters including said shutter, the number of shutters being equal to that of movable mirrors, the shutters respectively corresponding to the movable mirrors, and each shutter intercepting the light beam traveling toward the movable mirror between the lens and the movable mirror.

2. The optical switch according to claim 1, wherein the shutter includes a beam portion, which is supported in a cantilever manner and which is elastically deformable and which has a flat plate shape, the beam portion includes a shielding portion on its free end portion, and the shutter further includes an actuator, which bends/deforms the beam portion to move the shielding portion.

3. The optical switch according to claim 2, wherein the beam portion is supported substantially in parallel with a principal ray in the light beam traveling toward the movable mirror.

4. The optical switch according to claim 3, wherein the actuator deforms the beam portion by an electromagnetic force.

5. The optical switch according to claim 3, wherein the front surface (surface on which the light beam falls) of the shielding portion has a regular reflective property with respect to the light.

6. The optical switch according to claim 3, wherein the shutter intercepts the light beam traveling toward the movable mirror in a position of approximately 2 mm or less from the movable mirror.

7. The optical switch according to claim 3, wherein the shutter intercepts the light beam traveling toward the movable mirror in a position where the shutter has an optically confocal relation with the movable mirror.

8. The optical switch according to claim 2, wherein the beam portion is supported substantially vertically with respect to a principal ray in the light beam traveling toward the movable mirror.

9. The optical switch according to claim 8, wherein the front surface (surface on which the light beam falls) of the shielding portion has a non-regular reflective property with respect to the light.

10. The optical switch according to claim 2, wherein the shutter is driven in accordance with a driving electric signal, and intercepts the light beam traveling toward the movable mirror in a state in which the driving electric signal is not supplied.

11. The optical switch according to claim 1, wherein the shutter includes a beam portion, which is supported in a cantilever manner and which is elastically deformable, and a shielding portion, which is connected to a free end of the beam portion and which has a flat plate shape, the shielding portion extends substantially vertically with respect to the beam portion, and the shutter further includes an actuator, which bends/deforms the beam portion to move the shielding portion.

12. The optical switch according to claim 11, wherein the beam portion is positioned on the side of the movable mirror from the shielding portion.

13. The optical switch according to claim 11, wherein in a state in which the shutter intercepts the light beam traveling toward the movable mirror, the shielding portion is inclined by one degree or more with respect to a principal ray in the light beam traveling toward the movable mirror, about an axis that is substantially perpendicular to a rotation axis of the movable mirror and extends along the front surface of the movable mirror.

14. The optical switch according to claim 11, wherein the actuator deforms the beam portion by an electromagnetic force.

15. The optical switch according to claim 11, wherein a dimension of the movable mirror concerning a moving direction of the shielding portion of the shutter is longer than that of the shielding portion, and the light beam traveling toward the movable mirror falls on a position offset from a center of the movable mirror.

16. The optical switch according to claim 11, wherein the shutter is driven in accordance with a driving electric signal, and intercepts the light beam traveling toward the movable mirror in a state in which the driving electric signal is not supplied.

17. The optical switch according to claim 1, wherein the shutter includes a beam portion, which is supported in a center impeller manner and which is elastically deformable, and a shielding portion, which is supported by a substantial middle of the beam portion and which has a flat plate shape, the beam portion extends along the front surface (surface on which the light beam falls) of the shielding portion, and the shutter further includes an actuator, which deforms the beam portion to move the shielding portion along the front surface.

* * * * *